(12) United States Patent
Wittke (10) Patent No.: US 8,425,955 B2
(45) Date of Patent: Apr. 23, 2013

(54) NUTRITIONAL COMPOSITION WITH PREBIOTIC COMPONENT

(75) Inventor: Anja Wittke, Evansville, IN (US)

(73) Assignee: Mead Johnson Nutrition Company, Glenview, IL (US)

(*) Notice: Subject to any disclaimer, the term of this patent is extended or adjusted under 35 U.S.C. 154(b) by 345 days.

(21) Appl. No.: 12/843,610

(22) Filed: Jul. 26, 2010

(65) Prior Publication Data

US 2010/0316619 A1    Dec. 16, 2010

Related U.S. Application Data (63) Continuation-in-part of application No. 12/370,141, filed on Feb. 12, 2009, now Pat. No. 8,021,708.

(51) Int. Cl.
*A23D 7/00* (2006.01)
*A61K 31/715* (2006.01)
*A61K 31/202* (2006.01)

(52) U.S. Cl.
USPC ............ 426/71; 426/658; 426/601; 514/23; 514/558; 424/93.45

(58) Field of Classification Search ............ 426/71, 426/658, 601; 514/23, 558; 424/93.45
See application file for complete search history.

(56) References Cited

U.S. PATENT DOCUMENTS

| | | | |
|---|---|---|---|
| 4,859,488 A | 8/1989 | Kan et al. | |
| 5,374,567 A | 12/1994 | Cartagena | |
| 5,397,591 A | 3/1995 | Kyle et al. | |
| 5,437,880 A | 8/1995 | Takaichi et al. | |
| 5,550,156 A * | 8/1996 | Kyle .................. | 514/547 |
| 5,840,361 A | 11/1998 | Theuer et al. | |
| 6,576,251 B1 | 6/2003 | Stahl et al. | |
| 6,706,287 B2 | 3/2004 | Ranganathan et al. | |
| 6,841,149 B1 | 1/2005 | Spangler et al. | |
| 2002/0127211 A1 | 9/2002 | Brassart et al. | |
| 2003/0040492 A1 | 2/2003 | Haschke et al. | |
| 2003/0060445 A1 | 3/2003 | Wilson | |
| 2003/0072865 A1 | 4/2003 | Bindels et al. | |
| 2003/0129278 A1 | 7/2003 | Stahl et al. | |
| 2003/0157146 A1 | 8/2003 | Rautonen et al. | |

(Continued)

FOREIGN PATENT DOCUMENTS

| | | |
|---|---|---|
| CA | 2340103 | 2/2000 |
| WO | 2004026316 | 4/2004 |

(Continued)

OTHER PUBLICATIONS

Jie et al., "Studies on the effects of polydextrose intake on physiologic functions in Chinese people" Am J Clin Nutr 72:1503-1509, 2000.*

(Continued)

*Primary Examiner* — Rosanne Kosson
(74) *Attorney, Agent, or Firm* — Waddey & Patterson, P.C.; James R. Cartiglia; Rebecca M. Barnett (57) ABSTRACT

The present disclosure relates to nutritional compositions comprising a prebiotic component for inhibiting adherence of pathogens in the gastrointestinal tract of a subject and to the prebiotic component, which comprises galactooligosaccharide, polydextrose or any mixture thereof. The nutritional compositions of the present disclosure comprise a fat or lipid source, a protein source, and a carbohydrate source comprising an effective amount of the prebiotic component.

12 Claims, 5 Drawing Sheets

U.S. PATENT DOCUMENTS

| | | | |
|---|---|---|---|
| 2004/0062758 A1 | 4/2004 | Mayra-Makinen et al. |
| 2004/0071824 A1 | 4/2004 | Van Laere et al. |
| 2004/0072794 A1 | 4/2004 | Kaup et al. |
| 2004/0077539 A1 | 4/2004 | Maase |
| 2004/0121042 A1 | 6/2004 | Kudo et al. |
| 2004/0161422 A1 | 8/2004 | Ranganathan |
| 2004/0191234 A1 | 9/2004 | Haschke et al. |
| 2004/0191295 A1 | 9/2004 | Locniskar et al. |
| 2004/0219157 A1 | 11/2004 | Rochat et al. |
| 2007/0207132 A1 | 9/2007 | Speelmans et al. |

FOREIGN PATENT DOCUMENTS

| | | | |
|---|---|---|---|
| WO | WO 2005027663 A2 * | 3/2005 |
| WO | 2005039319 | 5/2005 |
| WO | 2005039597 | 5/2005 |

OTHER PUBLICATIONS

Isolauri et al., "Probiotics: effects on immunity," Am J Clin Nutr 73(suppl.):444S-450S, 2001.*

Alarcon, P. et al., "Gastrointestinal Tolerance of a New Infant Milk Formula in Healthy Babies: An International Study Conducted in 17 countries," Nutrition, 2002, vol. 18, pp. 484-489.

Ascholz-Ahrens, K. et al., "Effects of prebiotics on mineral metabolism," Am J Clin Nutr, 2001, vol. 73 (Suppl.), pp. 459S-464S.

Becker, W. et al., "Opinion of the Scientific Panel on Dietetic Products, Nutrition and Allergies on a request from the Commission relating to the safety and suitability for particular nutritional use by infants of fructooligosaccharides in infant formulae and follow-on formulae," The EFSA Journal, 2004, vol. 31, pp. 1-11.

Ben, X. et al., "Supplementation of milk formula with galactooligosaccharides improves intestinal micro-flora and fermentation in term infants," Chinese Medical Journal, 2004, vol. 117 No. 6, pp. 927-931. Online at http//www.cmj.org/information/full.asp?id=1655.

Benno, Y. et al., "The Intestinal Microflora of Infants: Composition of Fecal Flora in Breast-Fed and Bottle-Fed Infants," Microbiol. Immunol., 1984, vol. 28, No. 9, pp. 975-986.

Boehm, G. et al., "Effect of increasing number of intestinal bifidobacteria on the presence of clinically relevant pathogens," ESPGHAN Abstracts by J. Pediatr Gastroenterology Nutr., Apr. 2003, vol. 36(4), No. P179.

Boehm, G. et al., "Prebiotic Carbohydrates in Human Milk and Formulas," Acta Paediatrica, 2005, vol. 94 (Suppl. 449), pp. 18-21.

Boehm, G. et al., "Prebiotic in Infant Formulas," J. Clin Gastroenteroal, Jul. 2004, vol. 38, Supp. 2 pp. S76-S79.

Boehm, G. et al., "Supplementation of a bovine milk formula with an oligosaccharide mixture increases counts of faecal bifidobacteria in preterm infants," Arch. Dis. Child. Fetal Neonatal Ed., 2002, vol. 86, pp. F178-F181. Online at http://www.bmjjournals.com.

Bradley, C. et al., "Evaluation of Two Iron-Fortified, Milk-Based Formulas During Infancy," Pediatrics, May 1993, vol. 91, No. 5, pp. 908-914.

Brooks, D., "Polydextrose for Adding Fiber," Dairy Foods Magazine, Oct. 2003. Online at http://www.dairyfoods.com.

Brunser, O. et al., "Effect of Milk Formula with Prebiotics on the Intestinal Microbiota of Infants After an Antibiotic Treatmen," Pediatric Research, 2006, vol. 59, No. 3, pp. 451-456.

Craig, S.A.S., et al., "Polydextrose as Soluble Fiber: Physiological and Analytical Aspects," Cereal Foods World, vol. 43, No. 5, p. 370-376, May 1998.

Cummings, J. et al., "Prebiotics digestion and fermentation 1-3" Am. J. Clin. Nutr., 2001, vol. 73 Suppl., pp. 415-420.

Ellis, M., "What is the best therapy for constipation in infants?" Journal of Family Practice, Aug. 2002.—Clinical inquiries: from the Family Practice Inquiries Network. Online at http://www.findarticles.com/p/articles/mi_m0689/is_8_51/ai_90464039/print.

Erney, R., et al., "Variability of Human Milk Neutral Oligosaccharides in a Diverse Population," Journal of Pediatric Gastroenterology and Nutrition, 2000, vol. 30, pp. 181-192.

Fanaro, S. et al., "Intestinal Microflora in Early Infancy: Composition and Development," Acta Paediatr, 2003, Supp. 441, pp. 48-55.

Fanaro, S. et al., "Acidic Oligosaccharides from Pectin Hydrolysate as New Component for Infant Formulai: Effect on Intestinal Flora, Stool Characteristics, and pH," Journal of Pediatric Gastroenterology and Nutrition, Aug. 2005, vol. 41, pp. 186-190.

Gibson, G., et al. "Dietary Modulation of the Human Colonic Microbiota: Introducing the Concept of Prebiotics," J. Nutr., 1995, vol. 125, pp. 1401-1412.

Gibson, G., "Dietary Modulation of the Human Gut Microflora Using the Prebiotics Oligofructose and Inulin," J. Nutr., 1999, vol. 129, pp. 1438S-1441S.

Hyam, et al., "Effect of Infant Formula on Stool Characteristics of Young Infants," Pediatrics, 1995, vol. 95, pp. 50-54.

Isaacson, R.E. 1983. Bacterial adherence to mucosal surfaces: an attribute of virulence. Bulletin Européen de Physiopathologie Respiratoire 19:75-80.

Isolauri, E. et al., "Probiotics: effects on immunity1-3" Am. J. Clin. Nutr., 2001, vol. 73 Suppl., pp. 444-450.

Jankacek, R.J., "The Solubilization of Calcium Soaps by Fatty Acids," Lipids, 1991, vol. 26, pp. 250-253.

Kennedy, K. et al., "Double-blind, randomized trial of a synthetic triacylglycerol in formula-fed term infants: effects on stool biochemistry, stool characteristics, and bone mineralization1-3." Am J Clin Nutr, 1999, vol. 70, pp. 920-927.

Knol, et al., "Bifidobacterial species that are present in breast fed infants are stimulated in formula fed infants by changing to a formula containing prebiotics," ESPGHAN Abstracts from Journal of Pediatric Gastroenterology and Nutrition, Apr. 2002, vol. 34(4), p. 477, No. 2.

Kullen, M.J. et al., "The Delivery of Probiotics and Prebiotics to Infants," Current Pharmaceutical Design, 2005, vol. 11, pp. 55-74.

Kunz, et al., "Oligosaccharides in Human Milk: Structure, Functional, and Metabolic Aspects", Ann. Rev. Nutr. 20: 699-722 (2000).

Lloyd, B. et al., "Formula Tolerance in Postbreastfed and Exclusively Formula-fed Infants," Pediatrics, Jan. 1999, vol. 103, No. 1, pp. 1-6.

Lundequest, B. et al., "The Composition of the Faecal Microflora in Breastfed and Bottle Fed Infants from Birth to Eight Weeks," Acta Paediatr Scand., 1985, vol. 74, pp. 45-51.

Macfarlane, G. et al., "Probiotics and prebiotics: can regulating the activities of intestinal bacteria benefit health?" BMJ, 1999, vol. 318, pp. 999-1003.

Matsumoto, K. et al., "Galactooligosaccharides," A review published in Geneva 1994 by Gordon & Breach Science, pp. 90-106, Chapter 5.

Mattson, F. et al., "The absorbability by Rats of Various Triglycerides of Stearic and Oleic Acid and the Effect of Dietary Calcium and Magnesium," J Nutr, 1979, vol. 109, pp. 1682-1687. Online at http://jn.nutrition.org/cgi/content/abstract/109/10/1682.

Mevisen, E., et al., "Bifidobacterium, Bacteroides, and Clostridium spp. In Fecal Samples from Breast-Fed and Bottle-Fed Infants with and without Iron Supplement," Journal Clinical Microbiology, Feb. 1987, pp. 285-289.

Morley, R. et al., "Infant Feeding and maternal concerns about stool harness," Child: Care, Health and Development, 1997, vol. 23, No. 6, pp. 475-478.

Moro, G. et al., "Dietary prebiotic oligosaccharides are detectable in the faeces of formula-fed infants," Acta Paediatrica, 2005, vol. 94, Suppl. 449, pp. 27-30.

Moro, G., et al., "Dosage-Related Bifidogenic Effects of Galacto- and Fructooligosaccharides in Formula-Fed Term Infants," J. Pediatr Gastroenterol Nutr, vol. 34, No. 3, Mar. 2002.

Moro, G. et al., "Effects of a new mixture of prebiotics on faecal flora and stools in term infants," Acta Paediatr, 2003, Suppl. 441, pp. 77-79.

Mullane, N. R., et al., "Enterobacter sakazakii: biological properties and significance in dried infant milk formula (IMF) powder," International Journal of Dairy Technology 59: 102-111 (2006).

Newburg, D. et al., "Carbohydrates in Milks" Analysis, Quantities and Significance, Handbook of Milk Composition (1995) published by Academic Press, San Diego, Chapter 4, pp. 273-349.

Newburg, "Do the Binding Properties of Oligosaccharides in Milk Protect Human Infants from Gastrointestinal Bacteria?," J. Nutr. 217:S980-S984 (1997).

Orrhange, K. et al., "Factors controlling the bacterial colonization of the intestine in breastfed infants," Acta Paediatr, 1999, Suppl. 430, pp. 47-57.

Probert, H. et al., "Polydextros, Lactitol, and Fructo-Oligosaccharide Fermentation by Colonic Bacteria in a Three-Stage Continuous Culture System," Applied and Environmental Microbiology, Aug. 2004, vol. 70, No. 8, pp. 4505-4511.

Pylkans et al., "Comparison of Different Fibers for In Vitro Production of short Chain Fatty Acids by Intestinal Microflora." Journal of Medicinal Food, 2005, vol. 8(1), pp. 113-116.

Quinlan, P.T. et al., "The Relationship between Stool Hardness and Stool Composition in Breast and Formula-Fed Infants," Journal of Pediatric Gastroenterology and Nutrition, 1995, vol. 20, pp. 81-90.

Rinne, M. et al., "Similar bifidogenic effects of prebiotic-supplemented partially hydrolyzed infant formula and breastfeeding on infant gut microbiota," Immunology and Medical Microbiology, 2005, vol. 43, pp. 59-65.

Rivero-Urgell, et al., "Oligosaccharides: Application in Infant Food," Early Hum. Dev. 65(S):43-52 (2001).

Roberfroid, M.B., "Health benefits of non-digestible oligosaccharides," Adv Exp Med Biol. 1997;427:211-9. Review. PubMed PMID: 9361846. Abstract only.

Roller, M. et al., "Prebiotic Inulin Enriched with Oligofructose in Combination with the Probiotic Lactobacillus rhamnosus and Bifidobacterium lactis Modulates Intestinal Immune Functions in Rats1." American Society for Nutritional Sciences, Nutritional Immunology-Research Communication, 2003, pp. 153-156.

Rudloff, S. et al., "Detection of ligands for selectins in the oligosaccharide fraction of human milk," Eur J. Nutr, 2002, vol. 41, pp. 85-92.

Singh, K. et al., "Mothers' concept of the ideal number, colour and consistency of stools of their infants," Abstract from PubMed by Indian J. Matern Child Health, 1993, vol. 4, No. 2, pp. 62-63. Online at http://www.ncbi.nlm.nig.gov/entrez/query.fcgi?CMD=search&DB=pubmed.

Tianan Jiang et al., "Gas Production by Feces of Infants," Journal of Pediatric Gastroenterology and Nutrition, May 2001, vol. 32, pp. 534-541.

Van Limpt, C. et al., "Effect of Colonic Short Chain Fatty Acids, Lactate and pH on the Growth of Common Gut Pathogens," ESPR Abstracts from J. Pediatr Gastroenterol Nutr., 2005, p. 487, Abstract No. 134.

Van Loo, J. et al., "Functional food properties of non-digestible oligosaccharides: a consensus report from the ENDO project (DGXII ARII-CT94-1095)," British Journal of Nutrition, 1999, vol. 81, pp. 121-132.

Weaver, L. "Improving Infant Milk Formulas: Near the End of the Trail for the Holy Grail?" Journal of Pediatric Gastroenterology and Nutrition, Mar. 2003, vol. 36, pp. 301-310.

Xiao-Ming, Ben, et al., "Supplementation of milk formula with galacto-oligosaccharides improves intestinal microflora and fermentation in term infants." Chinese Medical Journal, 2004, vol. 117 No. 6, pp. 927-931. Online at http://www.Cmj.org/Periodical/PaperList.asp?id=LW8945.

Zhong Jie, et al., "Studies on the effects of polydextrose intake on physiologic functions in Chinese people1-3." Am J Clin Nutr, 2000, vol.72 pp. 1503-1509.

Zorf, D. et al., "Oligosaccharides anti-infection agents," Lancet 1996 347:1017-1021.

\* cited by examiner

NUTRITIONAL COMPOSITION WITH PREBIOTIC COMPONENT

RELATED APPLICATIONS

This application is a continuation-in-part of commonly assigned U.S. patent application Ser. No. 12/370,141, entitled "Method for Simulating the Functional Attributes of Human Milk Oligosaccharides in Formula-fed Infants," which was filed on Feb. 12, 2009 now U.S. Pat. No. 8,021,708 in the name of Bryon W. Petschow, which, in turn, claims priority to U.S. patent application Ser. No. 11/172,123, filed Jun. 30, 2005, which issued as U.S. Pat. No. 7,572,474, the disclosures of each are incorporated by reference herein in their entirety.

BACKGROUND

1. Technical Field

The present disclosure relates to enteral nutritional compositions comprising a prebiotic component. More specifically, the nutritional compositions of the present disclosure contain a prebiotic component comprising galactooligosaccharide (GOS). In some embodiments, the prebiotic component comprises galactooligosaccharide, polydextrose (PDX), a mixture of galactooligosaccharide and polydextrose, or a mixture of galactooligosaccharide, polydextrose and at least one other prebiotic. Moreover, the disclosure is further directed to a method of inhibiting adhesion of pathogens in the gastrointestinal tract of a human subject. The method comprises administering an effective amount of the prebiotic component.

2. Background Art

Infants and children are exposed to a variety of pathogens, and consequently, the incidence of infectious diseases peaks in the first 4 years of life. Infants do not have mature immune systems and are often incapable of mounting an effective immune response. Indeed, on a cellular level, infants have a decreased ability to concentrate leukocytes where necessary. (*Maternity and Gynecologic Care*, Bobak, Jensen, Zalar, Fourth Edition, p. 470) Consequently, infants are not able to limit invading pathogens due to a generalized hypofunction of their inflammatory and immune mechanisms. As such, improving the immune response in infants and children would provide an opportunity to reduce the incidence of infections and to maintain or improve the overall health of pediatric subjects.

*Cronobacter sakazakii* (also called *Enterobacter sakazakii*) is a motile, petrichious, non-sporeforming, Gram negative facultative anaerobe. It is an opportunistic pathogen that has been implicated in severe forms of meningitis, necrotizing enterocolitis, and sepsis in neonates. Although the environmental source of the microorganism is not known, powdered infant formula has been implicated in several outbreaks as well as other sporadic cases of infection. Of particular concern are reports of the organism being isolated from powdered milk processing plants and hospital utensils such as spoons and other implements used to prepare infant formula. (Mullane, N. R., D. Drudy, P. Whyte, M. O'Mahony, A. G. M. Scanell, P. G. Wall, S. Fanning. 2006. *Enterobacter sakazakii*: biological properties and significance in dried infant milk formula (IMF) powder. International Journal of Dairy Technology 59: 102-111.) Because colonization and subsequent infection, and invasion of *C. sakazakii* require that the organism adhere to host cell surfaces, agents that inhibit or block attachment of the pathogen to epithelial cells could be useful in reducing infections.

The infant gut microflora is rapidly established in the first few weeks following birth, and it has a great impact on an infant's immune system. The nature of this intestinal colonization is initially determined by the host's early exposure to environmental sources of microbes as well as to the health of the infant. Whether the infant is breast-fed or formula-fed also has a strong influence on the intestinal bacterial population.

Human milk contains a number of factors that may contribute to the growth and population of the gut microflora of infants. Among these factors is a complex mixture of more than 130 different oligosaccharides that reach levels as high as 8-12 g/L in transitional and mature milk. (Kunz, et al., *Oligosaccharides in Human Milk: Structure, Functional, and Metabolic Aspects*, Ann. Rev. Nutr. 20: 699-722 (2000).) These oligosaccharides are resistant to enzymatic digestion in the upper gastrointestinal tract, and they reach the colon intact, where they then serve as substrates for colonic fermentation.

Human milk oligosaccharides are believed to elicit an increase in the number of *Bifidobacteria* in the colonic microflora, along with a reduction in the number of potentially pathogenic bacteria. (Kunz, et al., Oligosaccharides in Human Milk: Structure, Functional, and Metabolic Aspects, Ann. Rev. Nutr. 20: 699-722 (2000); Newburg, Do the Binding Properties of Oligosaccharides in Milk Protect Human Infants from Gastrointestinal Bacteria?, J. Nutr. 217:S980-5984 (1997).) One way that human milk oligosaccharides may increase the numbers of *Bifidobacterium* spp. and reduce the number of potentially pathogenic bacteria is by acting as competitive receptors and inhibiting the binding of pathogens to the cell surface. Rivero-Urgell, et al., Oligosaccharides: Application in Infant Food, Early Hum. Dev. 65(S):43-52 (2001).

Because cow's milk and many commercially available infant formulas that are based on cow's milk provide only trace amounts of oligosaccharides, prebiotics can be used to supplement the diet of formula-fed infants. Prebiotics have been defined as non-digestible food ingredients that beneficially affect the host by selectively stimulating the growth and/or activity of one or a limited number of cells in the colon that can improve the health of the host.

The incorporation of various prebiotic ingredients into infant formulas has been disclosed. For example, U.S. Patent App. No. 20030072865 to Bindels, et al. discloses an infant formula with improved protein content and at least one prebiotic. The prebiotic component can be lacto-N-tetaose, lacto-N-fuco-pentaose, lactulose (LOS), lactosucrose, raffinose, galactooligosaccharide, fructo-oligosaccharide (FOS), oligosaccharides derived from soybean polysaccharides, mannose-based oligosaccharides, arabino-oligosaccharides, xylo-oligosaccharides, isomalto-oligo-saccharides, glucans, sialyl oligosaccharides, and fuco-oligosaccharides.

Similarly, U.S. Patent App. No. 2004/0191234 to Haschke discloses a method for enhancing the immune response which comprises administering at least one prebiotic. The prebiotic can be an oligosaccharide produced from glucose, galactose, xylose, maltose, sucrose, lactose, starch, xylan, hemicellulose, inulin, or a mixture thereof. The prebiotic can be present in an infant cereal.

Unfortunately, however, there are some disadvantages in the administration of the above to formula-fed infants. While they may beneficially affect the population of probiotics in the gut, the fermentation of many of these prebiotic substances occurs at a very rapid rate, which may produce excess gas, abdominal distension, bloating, and diarrhea. Therefore, the choice of prebiotic substances in nutritional compositions and infant formulas should be made with the goal of maximizing potential benefits, such as inhibiting the adhesion of pathogens, and minimizing unwanted side-effects.

BRIEF SUMMARY

Briefly, therefore, the present disclosure is directed, in an embodiment, to a nutritional composition comprising a prebiotic component that inhibits the adhesion of pathogens in the gastrointestinal tract and that is well-tolerated and does not produce or cause excess gas, abdominal distension, bloating or diarrhea. In some embodiments, the nutritional composition comprises a lipid or fat source, a protein source and an effective amount of the prebiotic component. In some embodiments, the nutritional composition also contains a source of long chain polyunsaturated fatty acid (LCPUFA). In some embodiments, the nutritional composition is nutritionally complete, and in some embodiments, the nutritional composition includes a probiotic.

Accordingly, the prebiotic component contains galactooligosaccharide, and in some embodiments, the prebiotic component additionally contains polydextrose, fructooligosaccharide (FOS), lactulose (LOS) or any combination or mixture thereof.

The prebiotic component contains an effective amount of oligosaccharides such that adhesion of harmful bacteria is inhibited in the gastrointestinal tract when the prebiotic component is administered to a subject. The prebiotic composition can include a plurality of oligosaccharides, whereby the combination of the oligosaccharides inhibits adherence of pathogens in the gastrointestinal tract. In certain embodiments, the prebiotic component comprises or consists of a combination of galactooligosaccharide and polydextrose. Moreover in some embodiments, the nutritional composition further includes a source of long chain polyunsaturated fatty acids.

The disclosure is also directed to a nutritional composition that inhibits the adhesion of pathogens in the gastrointestinal tract of a subject comprising, in some embodiments:

a. up to about 7 g/100 kcal of a fat or lipid, more preferably about 3 to about 7 g/100 kcal of a fat or lipid;

b. up to about 5 g/100 kcal of a protein source, more preferably about 1 to about 5 g/100 kcal of a protein source;

c. a prebiotic component comprising galactooligosaccharide; and d. about 5 to about 100 mg/100 kcal of a source of long chain polyunsaturated fatty acids which include DHA, more preferably about 10 to about 50 mg/100 kcal of a source of long chain polyunsaturated fatty acids which includes DHA.

In yet another embodiment, the disclosure is directed to a nutritional composition having improved digestibility, the composition comprising a lipid or fat, a protein source, a source of long chain polyunsaturated fatty acids that includes docosahexaenoic acid (DHA), and a prebiotic component that comprises at least 20% of an oligosaccharide mixture comprising galactooligosaccharide and/or a combination of galactooligosaccharide and polydextrose.

Additionally, the present disclosure relates to a method for inhibiting adhesion of pathogens in the gastrointestinal tract of a human subject.

In yet another embodiment, the present disclosure teaches a method for reducing the incidence of diarrhea due to adhesion of bacterial pathogens in the gastrointestinal tract.

It is to be understood that both the foregoing general description and the following detailed description present embodiments of the disclosure and are intended to provide an overview or framework for understanding the nature and character of the disclosure as it is claimed. The description serves to explain the principles and operations of the claimed subject matter. Other and further features and advantages of the present disclosure will be readily apparent to those skilled in the art upon a reading of the following disclosure.

DETAILED DESCRIPTION

Reference now will be made in detail to the embodiments of the present disclosure, one or more examples of which are set forth herein below. Each example is provided by way of explanation of the nutritional composition of the present disclosure and is not a limitation. In fact, it will be apparent to those skilled in the art that various modifications and variations can be made to the teachings of the present disclosure without departing from the scope or spirit of the disclosure. For instance, features illustrated or described as part of one embodiment, can be used with another embodiment to yield a still further embodiment.

Thus, it is intended that the present disclosure covers such modifications and variations as come within the scope of the appended claims and their equivalents. Other objects, features and aspects of the present disclosure are disclosed in or are obvious from the following detailed description. It is to be understood by one of ordinary skill in the art that the present discussion is a description of exemplary embodiments only and is not intended as limiting the broader aspects of the present disclosure.

"Nutritional composition" means a substance or formulation that satisfies at least a portion of a subject's nutrient requirements.

"Pediatric subject" means a human that is less than 13 years of age. In some embodiments, a pediatric subject refers to a human subject that is less than 8 years old.

"Infant" means a subject ranging in age from birth to not more than about one year and includes infants from 0 to about 12 months corrected age. The term infant includes low birth weight infants, very low birth weight infants, and preterm infants. The phrase "corrected age" means an infant's chronological age minus the amount of time that the infant was born premature. Therefore, the corrected age is the age of the infant if it had been carried to full term.

"Child" means a subject ranging in age from about 12 months to about 13 years. In some embodiments, a child is a subject between the ages of one and twelve years old. In other embodiments, the terms "children" or "child" refer to subjects that are two, three, four, five or six years old. In other embodiments, the terms "children" or "child" refer to any range of ages between about 12 months and about 13 years.

"Children's nutritional product" refers to a composition that satisfies at least a portion of the nutrient requirements of a child.

"Infant formula" means a composition that satisfies at least a portion of the nutrient requirements of an infant. In the United States, the content of an infant formula is dictated by the federal regulations set forth at 21 C.F.R. Sections 100, 106, and 107. These regulations define macronutrient, vitamin, mineral, and other ingredient levels in an effort to stimulate the nutritional and other properties of human breast milk.

"Nutritionally complete" means a composition that may be used as the sole source of nutrition, which would supply essentially all of the required daily amounts of vitamins, minerals, and/or trace elements in combination with proteins, carbohydrates, and lipids.

"Probiotic" means a microorganism with low or no pathogenicity that exerts beneficial effects on the health of the host.

"Prebiotic" means a non-digestible food ingredient that beneficially affects the host by selectively stimulating the growth and/or activity of one or a limited number of bacteria in the digestive tract that can improve the health of the host.

"Effective amount" means an amount that inhibits the adhesion of pathogens in the gastrointestinal tract of a subject.

"Prebiotic component" or "oligosaccharide mixture" means a combination of at least one prebiotic with at least one other prebiotic. In a preferred embodiment, the prebiotic component comprises galactooligosaccharide and polydextrose.

The phrase "functional attributes" mean any inherent quality or characteristic that causes something to occur. Examples of functional attributes of human milk oligosaccharides in the present disclosure can include the increase of the population and species of beneficial bacteria, production of a short chain fatty acid (SCFA) profile that is high in acetic acid and low in butyric acid, production of a slow rate and low extent of fermentation of prebiotics in the gut, and/or inhibition of adherence of pathogens, such as harmful bacteria, in the gastrointestinal tract of a subject.

The present disclosure describes a nutritional composition for a subject comprising a lipid source, a protein source and a prebiotic component, wherein the prebiotic component contains at least one carbohydrate that inhibits the adhesion of pathogens in the gastrointestinal tract. In other embodiments, the prebiotic component reduces the incidence of diarrhea and/or modulates stool characteristics in a positive way.

The present disclosure also describes a method for inhibiting adherence of pathogens in the gastrointestinal tract of a subject by administering an effective amount of a nutritional composition comprising a fat or lipid source, a protein source and a source of galactooligosaccharide. In some embodiments, the galactooligosaccharide may be administered as part of a prebiotic component. In some embodiments, the prebiotic may consist of galactooligosaccharide. In other embodiments, the prebiotic component may comprise the galactooligosaccharide administered together with another carbohydrate, such as polydextrose. The administration of galactooligosaccharide, of polydextrose or of a mixture thereof is physically well-tolerated by human subjects.

Suitable fat or lipid sources for practicing the present disclosure may be comprise any lipid source known in the art, including but not limited to, animal sources, e.g., milk fat, butter, butter fat, egg yolk lipid; marine sources, such as fish oils, marine oils, single-cell oils; vegetable and plant oils, such as corn oil, canola oil, sunflower oil, soybean oil, palmolein, coconut oil, high oleic sunflower oil, evening primrose oil, rapeseed oil, olive oil, flaxseed (linseed) oil, cottonseed oil, high oleic safflower oil, palm stearin, soy lecithin, palm kernel oil, wheat germ oil, medium chain triglyceride Bovine milk protein sources useful in practicing the present disclosure include, but are not limited to, milk protein powders, milk protein concentrates, milk protein isolates, nonfat milk solids, nonfat milk, nonfat dry milk, whey protein, whey protein isolates, whey protein concentrates, sweet whey, acid whey, casein, acid casein, caseinate (e.g. sodium caseinate, sodium calcium caseinate, calcium caseinate) and any combinations thereof.

In one embodiment, the proteins are provided as intact proteins. In other embodiments, the proteins are provided as a combination of both intact proteins and partially hydrolyzed proteins, with a degree of hydrolysis of between about 4% and 10%. In certain other embodiments, the proteins are more completely hydrolyzed. In yet another embodiment, the protein source may be supplemented with glutamine-containing peptides.

In a particular embodiment of the disclosure, the whey:casein ratio of the protein source is similar to that found in human breast milk. In an embodiment, the protein source comprises from about 40% to about 80% whey protein and from about 20% to about 60% casein.

The nutritional composition contains a prebiotic component. In some embodiments, the nutritional composition comprises galactooligosaccharide in addition to one or more other prebiotics as part of a prebiotic component. The term "prebiotic" as used herein refers to indigestible food ingredients which exert health benefits upon the host. Such health benefits may include, but are not limited to, selective stimulation of the growth and/or activity of one or a limited number of beneficial gut bacteria, stimulation of the growth and/or activity of ingested probiotic microorganisms, selective reduction in gut pathogens, inhibition of adherence of gut pathogens and favorable influence on gut short chain fatty acid profile. Such prebiotics may be naturally-occurring, synthetic, or developed through the genetic manipulation of organisms and/or plants, whether such new source is now known or developed later.

Prebiotics useful in the present disclosure may include oligosaccharides, polysaccharides, and other prebiotics that contain fructose, xylose, soya, galactose, glucose and mannose. Prebiotic oligosaccharides are non-digestible food ingredients that can act as anti-adhesives against bacterial adherence by mimicking the host cell receptor sites that intestinal pathogens recognize. Specifically, prebiotics useful in the present disclosure may include polydextrose, polydextrose powder, lactulose, lactosucrose, raffinose, gluco-oligosaccharide, inulin, fructo-oligosaccharide, isomalto-oligosaccharide, soybean oligosaccharides, lactosucrose, xylo-oligosaccharide, chito-oligosaccharide, manno-oligosaccharide, aribino-oligosaccharide, siallyl-oligosaccharide, fuco-oligosaccharide, galactooligosaccharide, and gentio-oligosaccharides.

The galactooligosaccharide that is utilized in the nutritional composition(s) of the present disclosure is comprised of several galactose-containing species of varying lengths. GOS is a mixture of oligosaccharides consisting of D-glucose and D-galactose. It is sometimes referred to as trans-galactooligosaccharide. It is produced from D-lactose by 6-galactosidase, which can be obtained from *Aspergillus oryzae*. GOS has been suggested to increase calcium absorption and prevention of bone loss in adults. GOS has been identified as a prebiotic that is useful for administration to infants.

The amount of galactooligosaccharide in the nutritional composition may, in an embodiment, be from about 0.1 mg/100 Kcal to about 1.0 mg/100 Kcal. In another embodiment, the amount of galactooligosaccharide in the nutritional composition may be from about 0.1 mg/100 Kcal to about 0.5 mg/100 Kcal.

Meanwhile, the polydextrose of the present disclosure is composed of randomly cross-linked glucose units with several types of glycosidic bonds, and its anti-adhesive activity has not been previously studied. In some embodiments, PDX is synthesized from a mixture of dextrose, about 10% sorbitol and about 1% citric acid. PDX is a non-digestible carbohydrate that is synthesized from randomly cross-linked glucose and sorbitol. It is not digested in the upper GI tract and is only partially fermented in the lower GI tract, making it a beneficial ingredient for digestive health. The physiological benefits of PDX include increased fecal bulk, reduced transit time, lower fecal pH and reduced concentration of putrefactive substances in the colon. In adults, PDX ingestion has also been shown to aid in the promotion and growth of beneficial bacteria in the intestine and production of SCFAs.

PDX has been identified as a prebiotic substance for adults based on its functions in the GI tract. PDX has not, however, been identified as a prebiotic that provides the benefits of the present disclosure and that can be administered to pediatric subjects, such as infants or children. The gut microflora of infants is well known to be less developed than that of an adult. While the microflora of the adult human consists of more than $10^{13}$ microorganisms and nearly 500 species, the gut microflora of an infant contains only a fraction of those microorganisms, both in absolute number and species diversity. Because the bacterial populations and species vary immensely between the gut of an infant and an adult, it cannot be assumed that a prebiotic substance that has a beneficial effect on adults would also have a beneficial effect on infants.

Polydextrose is commercially available from a variety of sources. For example, STA-LITE®. Polydextrose is available in 5 lb bags from Honeyville Grain, Inc., located in Salt Lake City, Utah. Polydextrose is commercially available from Danisco Sweeteners, Ltd., located in the United Kingdom.

PDX is well-suited for incorporation into a nutritional composition, such as an infant formula, as it contains only 1 Cal/g, as compared to 4 Cal/g for typical prebiotics. It is also highly soluble and neutral tasting. Therefore, its addition to a nutritional composition would not change the physical or taste characteristics of the composition.

The form of administration of PDX in the method of the disclosure is not critical, as long as an effective amount is administered. Most conveniently, the PDX is supplemented into nutritional composition, in some embodiments an infant formula, which is then fed to a subject.

The amount of polydextrose in the nutritional composition may, in an embodiment, be within the range of from about 0.1 mg/100 Kcal to about 0.5 mg/100 Kcal. In another embodiment, the amount of polydextrose may be about 0.3 mg/100 Kcal. In a particular embodiment, galactooligosaccharide and polydextrose are supplemented into the nutritional composition in a total amount of about at least about 0.2 mg/100 Kcal and can be about 0.2 mg/100 Kcal to about 1.5 mg/100 Kcal.

In a particular embodiment of the present disclosure, PDX is administered in combination with GOS. In this embodiment, PDX and GOS can be administered in a ratio of PDX:GOS of between about 9:1 and 1:9. In another embodiment, the ratio of PDX:GOS can be between about 5:1 and 1:5. In yet another embodiment, the ratio of PDX:GOS can be between about 1:3 and 3:1. In a particular embodiment, the ratio of PDX to GOS can be about 1:1. In another particular embodiment, the ratio of PDX to GOS can be about 8:2.

An effective amount of the PDX:GOS combination may be between about 1.0 g/L and 10.0 g/L, administered daily. In another embodiment, an effective amount of the PDX:GOS combination may be between about 2.0 g/L and 8.0 g/L, administered daily. In a particular embodiment, an effective amount of the PDX:GOS combination may be about 2 g/L of PDX and 2 g/L of GOS, administered daily.

In another specific embodiment of the present disclosure, galactooligosaccharide is administered in combination with FOS, which is also sometimes called oligofructose. FOS is a carbohydrate, specifically a chain polymer of the sugar fructose. FOS has been identified as a prebiotic that is useful for administration to infants.

In another specific embodiment of the present disclosure, PDX is administered in combination with LOS. LOS is a semisynthetic disaccharide formed from D-galactose and D-fructose and joined by a β-glucosidic linkage. It is resistant to hydrolysis by human digestive enzymes, but is fermented in the small intestine. It is highly soluble and has a sweet taste. LOS has been identified as a prebiotic that is useful for administration to infants.

In this embodiment, PDX and LOS can be administered in a ratio of between about 9:1 and 1:9. In another embodiment, the ratio of PDX to LOS can be between about 5:1 and 1:5. In yet another embodiment, the ratio of PDX to LOS can be between about 3:1 and 1:3.

In a particular embodiment, the ratio of PDX to LOS can about 5:5. In another particular embodiment, the ratio of PDX to LOS can be about 8:2.

An effective amount of the PDX:LOS combination may be between about 1.0 g/L and 10.0 g/L, administered daily. In another embodiment, an effective amount of the PDX:LOS combination may be between about 2.0 g/L and 8.0 g/L, administered daily. In a particular embodiment, an effective amount of the PDX:LOS combination may be about 2 g/L of PDX and 2 g/L of LOS, administered daily.

In yet another embodiment of the present disclosure, PDX is administered in combination with both GOS and LOS. In this embodiment, the PDX:GOS:LOS combination can be administered in a ratio of about 50:33:17. Alternatively, the ratio of the PDX:GOS:LOS combination can be about 1:1:1. In a particular embodiment, the ratio of PDX:GOS:LOS can be about 1:1.5:1.

An effective amount of the PDX:GOS:LOS combination may be between about 1.0 g/L and 10.0 g/L, administered daily. In another embodiment, an effective amount of the PDX:GOS:LOS combination may be between about 2.0 g/L and 8.0 g/L, administered daily. In an embodiment, an effective amount of the PDX:GOS:LOS combination may be about 2 g/L PDX, 2 g/L GOS and 2 g/L LOS, administered daily. In a particular embodiment, an effective amount of the PDX:GOS:LOS combination may be about 2 g/L PDX, 1.32 g/L GOS and 2.6 g/L LOS, administered daily. In another embodiment, an effective amount of the PDX:GOS:LOS combination may be about 4 g/L PDX, 2.64 g/L GOS and 3.6 g/L LOS, administered daily.

The nutritional composition of the present application, in some embodiments, comprises a prebiotic component comprising galactooligosaccharide and polydextrose. The nutritional composition of the present disclosure inhibits adhesion of pathogens in the gastrointestinal tract of a subject. In some embodiments, the nutritional composition specifically inhibits the adherence of *C. sakazakii* 4603. In some embodiments, the nutritional composition inhibits the adherence of *C. sakazakii* 29004.

The initial adherence of pathogens to host cell surfaces is one of the first steps prior to colonization and infection. Most human pathogens that are able to adhere to host tissues have an advantage over those that do not, since they are more likely to evade and resist the defense systems of the host. (Shoaf, K., G. L. Mulvey, G. D. Armstrong, R. W. Hutkins. 2006. Prebiotic galactooligosaccharides reduce adherence of enteropathogenic *Escherichia coli* to tissue culture cells. Infection and Immunity 74:6920-6928.) Adherence between the pathogen and the host cells is most commonly mediated via lectin-like adhesins expressed by the bacteria and ligand-like carbohydrates located on the surface of the host epithelial cells. Indeed, most intestinal pathogens recognize specific monosaccharide residues or short oligosaccharide sequences as binding receptors. Bacterial variants that are unable to express functional adhesins are unable to adhere and initiate infections, indicating that for these pathogens, adherence is required to cause disease (Isaacson, R. E. 1983. Bacterial adherence to mucosal surfaces: an attribute of virulence. Bulletin Européen de Physiopathologie Respiratoire 19:75-80.). This finding has led to the suggestion that agents that inhibit adherence can reduce incidences of infection. (Zorf, D. and Roth, S. 1996. Oligosaccharides anti-infection agents. *Lancet* 347:1017-1021)

The nutritional composition of the present disclosure uses a prebiotic component of oligosaccharide decoys that mimic the carbohydrate binding sites ordinarily recognized by pathogens as binding receptors on the surface of host epithelial cells. The prebiotic component of oligosaccharides competes with the cognate sugars for binding to the adhesin and thereby inhibits bacterial adherence in the gastrointestinal tract.

Accordingly, to arrive at the nutritional composition of the present disclosure, the individual carbohydrates GOS and PDX, as well as a component of GOS and PDX, were studied in an in vitro model to assess their respective abilities to inhibit adherence of pathogens to human cells lines.

Galactooligosaccharide and polydextrose were used for adherence inhibition assays performed with human cell lines (HEp-2 and Caco-2 cells) infected with enteric pathogens *Escherichia coli* (EPEC strain E2348/69) or *C. sakazakii* strains (ATCC 4603, 29004, 4593, 4583, ES415). The prebiotics GOS, PDX, or a prebiotic component comprising GOS and PDX were administered at a concentration of 16 mg/ml in the assay and analyzed for their adherence inhibition of the single pathogens to the epithelial cell lines.

For adherence assays, confluent tissue culture monolayers were prepared, and the prebiotics were mixed with *C. sakazakii* 4603 or ATCC 29004 (approximately $10^7$ cells) prior to adding them to the HEp-2 cells. Following an incubation of 3 hours, which had been determined in preliminary experiments to be the optimal incubation time for adherence, at 37° C. in the $CO_2$ incubator, the wells were washed 5 times with PBS. Cells were then fixed for microscopic enumeration or were instead detached and serial dilution plated on agar for culture enumeration.

For the adherence assays with EPEC, each prebiotic was added at a final concentration of about 16 mg/ml and incubated with HEp-2 cells for 30 minutes. Cells with microcolonies of EPEC or that consisted of four or more bacteria were considered positive for having a typical localized adherence phenotype. For *C. sakazakii* adherence occurs via cluster formation and diffuse adherence. Adherence inhibition was calculated as the number of adhered bacteria per cell in the control minus the number of adhered bacteria per cell in the treatment divided by the number of adhered bacteria per cell in the control.

When measured by the microscopic method, a significant reduction (56%) in adherence of *C. sakazakii* 4603 was observed in the presence of GOS (16 mg/ml). Adherence inhibition also occurred (48%) when a GOS-PDX component (8 mg/ml each) was tested, although PDX by itself had less effect. A similar pattern for this strain on HEp-2 cells was observed using cultural enumeration. Similar results were also observed for Caco-2 cells and also for another strain of *C. sakazakii* (ATCC 29004). Thus, the results suggest that GOS and the prebiotic component of PDX and GOS have anti-adhesive effects on pathogens, such as *C. sakazakii*, and that the prebiotics directly inhibit the adherence of pathogenic organisms to gastrointestinal epithelial cells.

In the compositions and methods of the present disclosure, an effective amount of a prebiotic component comprising galactooligosaccharide and polydextrose is administered to a subject for the purpose of simulating the functional attributes of human milk oligosaccharides. In an embodiment, the total amount of prebiotics present in the nutritional composition may be from about 1.0 g/L to about 10.0 g/L of the composition. More preferably, the total amount of prebiotics present in the nutritional composition may be from about 2.0 g/L and about 8.0 g/L of the composition. At least 20% of the prebiotics may comprise a mixture of galactooligosaccharide and polydextrose. The amount of each of galactooligosaccharide and polydextrose in the nutritional composition may, in an embodiment, be within the range of from about 1.0 g/L to about 4.0 g/L.

In some embodiments, the nutritional composition of the disclosure contains a source of long chain polyunsaturated fatty acids (LCPUFAs) that comprises docosahexaenoic acid (DHA). Other suitable LCPUFAs include, but are not limited to, α-linoleic acid, γ-linoleic acid, linoleic acid, linolenic acid, eicosapentaenoic acid (EPA) and arachidonic acid (ARA).

In one embodiment, the nutritional composition is supplemented with both DHA and ARA. In this embodiment, the weight ratio of ARA:DHA may be from about 1:3 to about 9:1. In one embodiment of the present disclosure, this ratio is from about 1:2 to about 4:1. In one embodiment, both DHA and ARA are administered in combination with PDX.

The amount of long chain polyunsaturated fatty acids in the nutritional composition is advantageously at least about 5 mg/100 Kcal, and may vary from about 5 mg/100 kcal to about 100 mg/100 kcal, more preferably from about 10 mg/100 kcal to about 50 mg/100 kcal.

The nutritional composition may be supplemented with oils containing DHA and ARA using standard techniques known in the art. For example, DHA and ARA may be added to the composition by replacing an equivalent amount of an oil, such as high oleic sunflower oil, normally present in the composition. As another example, the oils containing DHA and ARA may be added to the composition by replacing an equivalent amount of the rest of the overall fat component normally present in the composition without DHA and ARA.

If utilized, the source of DHA and ARA may be any source known in the art such as marine oil, fish oil, single cell oil, egg yolk lipid, and brain lipid. In some embodiments, the DHA and ARA are sourced from the single cell Martek oil, DHASCO®, or variations thereof. The DHA and ARA can be in natural form, provided that the remainder of the LCPUFA source does not result in any substantial deleterious effect on the infant. Alternatively, the DHA and ARA can be used in refined form.

In an embodiment of the present disclosure, sources of DHA and ARA are single cell oils as taught in U.S. Pat. Nos. 5,374,567; 5,550,156; and 5,397,591, the disclosures of which are incorporated herein in their entirety by reference. However, the present disclosure is not limited to only such oils.

In certain embodiments of the disclosure, the nutritional composition may contain one or more probiotics. Any probiotic known in the art may be acceptable in this embodiment provided it achieves the intended result. In a particular embodiment, the probiotic may be selected from any *Lactobacillus* species, *Lactobacillus rhamnosus* GG, *Bifidobacterium* species, *Bifidobacterium longum*, and *Bifidobacterium animalis* subsp. *lactis* BB-12 (DSM No. 10140) or combinations thereof.

If included in the composition, the amount of the probiotic may vary from about $10^4$ to about $10^{10}$ colony forming units (cfu) per kg body weight per day. An average infant weighs between about 2 kg and about 15 kg. Thus, in some embodiments, the nutritional composition of the present disclosure will comprise between about $2 \times 10^4$ and $15 \times 10^{10}$ cell equivalents of probiotic per daily serving to an infant. In another embodiment, the amount of the probiotic may vary from about $10^6$ to about $10^9$ cfu per kg body weight per day; thereby delivering between about $2 \times 10^6$ and $15 \times 10^9$ cell equivalents of probiotic per daily serving to an infant. In yet another embodiment, the amount of the probiotic may be at least about $10^6$ cfu per kg body weight per day; thereby delivering at least about $2 \times 10^6$ cfu per day to an infant.

In an embodiment, the probiotic(s) may be viable or non-viable. As used herein, the term "viable", refers to live microorganisms. The term "non-viable" or "non-viable probiotic" means non-living probiotic microorganisms, their cellular components and/or metabolites thereof. Such non-viable probiotics may have been heat-killed or otherwise inactivated, but they retain the ability to favorably influence the health of the host. The probiotics useful in the present disclosure may be naturally-occurring, synthetic or developed through the genetic manipulation of organisms, whether such new source is now known or later developed.

In an embodiment, the nutritional composition comprising the prebiotic component is provided as a nutritionally complete infant formula, which contains suitable types and amounts of lipid, carbohydrate, protein, vitamins and minerals. In this embodiment, the amount of carbohydrate may vary from about 8 to about 12 g/100 kcal, with protein from about 1 to about 5 g/100 kcal, lipid or fat from about 3 to about 7 g/100 kcal and may be supplemented with an effective amount of the prebiotic component.

Nutritional compositions of the present disclosure may be milk-based, in the form of liquid, evaporated, condensed or dry milk. In some embodiments, the nutritional composition may also include non-dairy liquid or solid food products, protein, flavors or flavor masking agents, sweeteners and vitamins or dietary supplements.

In some embodiments, the nutritional composition may be nutritionally complete, containing suitable types and amounts of lipids, carbohydrates, proteins, vitamins and minerals to be a subject's sole source of nutrition. In one embodiment, the nutritional composition is a children's nutritional product. In another embodiment, the nutritional composition comprises an infant formula. In yet another embodiment, the nutritional composition comprises a nutritionally complete infant formula. In still another embodiment, the nutritional composition comprises a nutritionally complete children's nutritional product.

The disclosed nutritional composition may be provided in any form known in the art, such as a powder, a gel, a suspension, a paste, a solid, a liquid, a liquid concentrate, reconstituteable powdered milk substitute, or a ready-to-use product. The nutritional composition may, in certain embodiments, comprise a nutritional supplement, children's nutritional product, infant formula, human milk fortifier, growing up milk or any other nutritional composition designed for a pediatric subject. Nutritional compositions of the present disclosure include, for example, orally-ingestible, health-promoting substances including, for example, chewable foods, beverages, tablets, capsules and powders. The nutritional composition of the present disclosure may be standardized to a specific caloric content, it may be provided as a ready-to-use product, or it may be provided in a concentrated form.

The nutritional composition of the present disclosure can be prepared using any method known in the art. In one embodiment, PDX is provided in powder form. It can be mixed with water and other ingredients in a mixing tank. If GOS and/or LOS are included in the composition, they can be provided in powdered or liquid form. The mixture can then be pasteurized, homogenized and spray-dried to make a finished powder or canned and retorted to make a liquid product.

Furthermore, the prebiotic component can be administered as a nutritional supplement. For example, GOS can be ingested in the form of a pill, tablet, capsule, caplet, powder, liquid or gel. In this embodiment, the GOS can be ingested in combination with other nutrient supplements, such as vitamins, or in combination with a LCPUFA supplement, such as DHA or ARA.

In another embodiment, GOS can be provided in a form suitable for infants selected from the group consisting of follow-on formula, beverage, milk, yoghurt, fruit juice, fruit-based drink, chewable tablet, cookie, cracker, or a combination thereof.

In a method of the present disclosure, the subject is a formula-fed infant. In one embodiment the subject is formula-fed from birth. In another embodiment, the subject is breast-fed from birth until an age which is less than one year, and is formula-fed thereafter, at which time PDX supplementation begins.

In embodiments providing a children's nutritional product, one or more vitamins and/or minerals may be added in amounts sufficient to supply the daily nutritional requirements of children between one and thirteen years old. It is to be understood by one of ordinary skill in the art that vitamin and mineral requirements will vary for children between the ages of one and thirteen years. Thus, the embodiments are not intended to limit the nutritional composition to a particular age group but, rather, to provide a range applicable to children between the one and thirteen years old.

In embodiments providing a nutritional composition for a child, the composition may optionally include, but is not limited to, one or more of the following vitamins or derivations thereof: vitamin $B_1$ (thiamin, thiamin pyrophosphate, TPP, thiamin triphosphate, TTP, thiamin hydrochloride, thiamin mononitrate), vitamin $B_2$ (riboflavin, flavin mononucleotide, FMN, flavin adenine dinucleotide, FAD, lactoflavin, ovoflavin), vitamin $B_3$ (niacin, nicotinic acid, nicotinamide, niacinamide, nicotinamide adenine dinucleotide, NAD, nicotinic acid mononucleotide, NicMN, pyridine-3-carboxylic acid), vitamin $B_3$-precursor tryptophan, vitamin $B_6$ (pyridoxine, pyridoxal, pyridoxamine, pyridoxine hydrochloride), pantothenic acid (pantothenate, panthenol), folate (folic acid, folacin, pteroylglutamic acid), vitamin $B_{12}$ (cobalamin, methylcobalamin, deoxyadenosylcobalamin, cyanocobalamin, hydroxycobalamin, adenosylcobalamin), biotin, vitamin C (ascorbic acid), vitamin A (retinol, retinyl acetate, retinyl palmitate, retinyl esters with other long-chain fatty acids, retinal, retinoic acid, retinol esters), vitamin D (calciferol, cholecalciferol, vitamin $D_3$, 1,25,-dihydroxyvitamin D), vitamin E ($\alpha$-tocopherol, $\alpha$-tocopherol acetate, $\alpha$-tocopherol succinate, $\alpha$-tocopherol nicotinate, $\gamma$-tocopherol), vitamin K (vitamin $K_1$, phylloquinone, naphthoquinone, vitamin $K_2$, menaquinone-7, vitamin $K_3$, menaquinone-4, menadione, menaquinone-8, menaquinone-8H, menaquinone-9, menaquinone-9H, menaquinone-10, menaquinone-11, menaquinone-12, menaquinone-13), choline, inositol, $\beta$-carotene and any combinations thereof.

In embodiments providing a children's nutritional product, the composition may optionally include, but is not limited to, one or more of the following minerals or derivations thereof: boron, calcium, calcium acetate, calcium gluconate, calcium chloride, calcium lactate, calcium phosphate, calcium sulfate, chloride, chromium, chromium chloride, chromium picolonate, copper, copper sulfate, copper gluconate, cupric sulfate, fluoride, iron, carbonyl iron, ferric iron, ferrous fumarate, ferric orthophosphate, iron trituration, polysaccharide iron, iodide, iodine, magnesium, magnesium carbonate, magnesium hydroxide, magnesium oxide, magnesium stearate, magnesium sulfate, manganese, molybdenum, phosphorus, potassium, potassium phosphate, potassium iodide, potassium chloride, potassium acetate, selenium, sulfur, sodium, docusate sodium, sodium chloride, sodium selenate, sodium molybdate, zinc, zinc oxide, zinc sulfate and mixtures thereof. Non-limiting exemplary derivatives of mineral compounds include salts, alkaline salts, esters and chelates of any mineral compound.

The minerals can be added to children's nutritional compositions in the form of salts such as calcium phosphate, calcium glycerol phosphate, sodium citrate, potassium chloride, potassium phosphate, magnesium phosphate, ferrous sulfate, zinc sulfate, cupric sulfate, manganese sulfate, and sodium selenite. Additional vitamins and minerals can be added as known within the art.

In an embodiment, the children's nutritional composition may contain between about 10 and about 50% of the maximum dietary recommendation for any given country, or between about 10 and about 50% of the average dietary recommendation for a group of countries, per serving of vitamins A, C, and E, zinc, iron, iodine, selenium, and choline. In another embodiment, the children's nutritional composition may supply about 10-30% of the maximum dietary recommendation for any given country, or about 10-30% of the average dietary recommendation for a group of countries, per serving of B-vitamins. In yet another embodiment, the levels of vitamin D, calcium, magnesium, phosphorus, and potassium in the children's nutritional product may correspond with the average levels found in milk. In other embodiments, other nutrients in the children's nutritional composition may be present at about 20% of the maximum dietary recommendation for any given country, or about 20% of the average dietary recommendation for a group of countries, per serving.

The children's nutritional composition of the present disclosure may optionally include one or more of the following flavoring agents, including, but not limited to, flavored extracts, volatile oils, cocoa or chocolate flavorings, peanut butter flavoring, cookie crumbs, vanilla or any commercially available flavoring. Examples of useful flavorings include, but are not limited to, pure anise extract, imitation banana extract, imitation cherry extract, chocolate extract, pure lemon extract, pure orange extract, pure peppermint extract, honey, imitation pineapple extract, imitation rum extract, imitation strawberry extract, or vanilla extract; or volatile oils, such as balm oil, bay oil, bergamot oil, cedarwood oil, cherry oil, cinnamon oil, clove oil, or peppermint oil; peanut butter, chocolate flavoring, vanilla cookie crumb, butterscotch, toffee, and mixtures thereof. The amounts of flavoring agent can vary greatly depending upon the flavoring agent used. The type and amount of flavoring agent can be selected as is known in the art.

The nutritional compositions of the present disclosure may optionally include one or more emulsifiers that may be added for stability of the final product. Examples of suitable emulsifiers include, but are not limited to, lecithin (e.g., from egg or soy), alpha lactalbumin and/or mono- and di-glycerides, and mixtures thereof. Other emulsifiers are readily apparent to the skilled artisan and selection of suitable emulsifier(s) will depend, in part, upon the formulation and final product.

The nutritional compositions of the present disclosure may optionally include one or more preservatives that may also be added to extend product shelf life. Suitable preservatives include, but are not limited to, potassium sorbate, sodium sorbate, potassium benzoate, sodium benzoate, calcium disodium EDTA, and mixtures thereof.

The nutritional compositions of the present disclosure may optionally include one or more stabilizers. Suitable stabilizers for use in practicing the nutritional composition of the present disclosure include, but are not limited to, gum arabic, gum ghatti, gum karaya, gum tragacanth, agar, furcellaran, guar gum, gellan gum, locust bean gum, pectin, low methoxyl pectin, gelatin, microcrystalline cellulose, CMC (sodium carboxymethylcellulose), methylcellulose, hydroxypropyl methyl cellulose, hydroxypropyl cellulose, DATEM (diacetyl tartaric acid esters of mono- and diglycerides), dextran, carrageenans, and mixtures thereof.

All percentages, parts and ratios as used herein are by weight of the total formulation, unless otherwise specified.

The nutritional composition of the present disclosure may be substantially free of any optional or selected ingredients described herein, provided that the remaining nutritional composition still contains all of the required ingredients or features described herein. In this context, and unless otherwise specified, the term "substantially free" means that the selected composition may contain less than a functional amount of the optional ingredient, typically less than 0.1% by weight, and also, including zero percent by weight of such optional or selected ingredient.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The methods and compositions of the present disclosure, including components thereof, can comprise, consist of, or consist essentially of the essential elements and limitations of the embodiments described herein, as well as any additional or optional ingredients, components or limitations described herein or otherwise useful in nutritional compositions.

As used herein, the term "about" should be construed to refer to both of the numbers specified in any range. Any reference to a range should be considered as providing support for any subset within that range.

EXAMPLES

The following examples are provided to illustrate some embodiments of the nutritional composition of the present disclosure but should not be interpreted as any limitation thereon. Other embodiments within the scope of the claims herein will be apparent to one skilled in the art from the consideration of the specification or practice of the nutritional composition or methods disclosed herein. It is intended that the specification, together with the example, be considered to be exemplary only, with the scope and spirit of the disclosure being indicated by the claims which follow the example.

Example 1

This example describes the experimental procedures and methods used to assess the ability of galactooligosaccharide, of polydextrose and of a combination of galactooligosaccharide and polydextrose to inhibit adherence of the pathogens to human cells.

Five *C. sakazakii* strains (Table 1) were obtained. In some experiments, the enteropathogenic *E. coli* E2348/69 was also used. Prior to each experiment, freezer stocks of each organism were plated onto Tryptic Soy Agar (TSA; Difco) and grown overnight at 37° C. A single colony was inoculated in 10 ml of Tryptic Soy Broth (TSB; Difco) and incubated aerobically, without shaking. Preliminary experiments revealed that adherence rates were highest when cells were in late log phase. Therefore, after 6 hour incubation, cultures were harvested by centrifugation (3,184×g for 8 minutes). The cells were washed once with phosphate-buffered saline (PBS) and re-suspended in minimal essential medium (MEM; Hyclone, Logan, Utah) supplemented with 10% fetal bovine serum (FBS; Hyclone). Minimal essential medium was pre-equilibrated at tissue culture conditions (5% $CO_2$, 95% relative humidity, 37° C.). Based on additional preliminary experiments, two strains (4603 and 29004) repeatedly gave the highest adherence rates on HEp-2 cells and were used for all subsequent experiments.

TABLE 1

| Strains and sources | |
| --- | --- |
| Strains | Source |
| *Enterobacter sakazakii* 4593 | Milk powder isolate (Infant formula) |
| *Enterobacter sakazakii* 4603 | Milk powder isolate (Infant formula) |
| *Enterobacter sakazakii* 29004 | ATCC (deposited by CDC) |
| *Enterobacter sakazakii* 4583 | Enterocolitis isolate |
| *Enterobacter sakazakii* ES 415 | Meningitis isolate |

HEp-2 cells were obtained from the American Type Culture Collection. Cells were grown in 75 $cm^2$ tissue culture flasks containing 25 ml of MEM supplemented with 10% FBS in a $CO_2$ incubator at tissue culture conditions. Confluent HEp-2 cells were harvested by adding 0.5 ml of 0.25% Trypsin-EDTA Solution and incubating for 15 minutes at tissue culture conditions. Trypsin was inactivated with 0.5 ml of FBS. Cells were then seeded onto 12-mm diameter glass cover slips in 24-well tissue culture plates at approximately 3.6×10$^5$ viable cells per well, and 500 µl of MEM supplemented with 10% FBS was added to each well. Plates were incubated under tissue culture conditions for two days prior to the start of each experiment, or until confluence was reached. Media was replaced one day before the experiment.

Galactooligosaccharide was obtained as a concentrated syrup and was lyophilized to give a final product of 95% total solids. The galactooligosaccharide and polydextrose were then prepared as concentrated stock solutions with distilled sterile water at a final concentration of 160 mg/ml. The solutions were filter sterilized by passage though 0.22 µm filters.

A component of PDX and GOS was prepared by mixing equal volumes to give 80 mg/ml of PDX and 80 mg/ml of GOS in the component stock solution. Experiments using GOS, PDX, and a combination of GOS and PDX were also performed with *E. coli* E2348/69.

Cell suspensions of *C. sakazakii* 4603 and ATCC 29004 were prepared as described above. Prebiotics were mixed with bacterial cultures (in MEM supplemented with 10% FBS) prior to addition to the HEp-2 and CaCo-2. The prebiotic solutions represented 10% of the final volume of the suspension, giving a final concentration of 16 mg/ml of prebiotic in the assay mixtures. The plates were incubated for 3 hours in the $CO_2$ incubator at tissue culture conditions. Preliminary experiments indicated that 3 hours of incubation was optimal for adherence of the bacterial strains to the HEp-2 tissue culture and to the CaCo-2 tissue culture. The wells were then washed 5 times with PBS to remove non-adhered bacterial cells. All HEp-2 experiments were done in duplicate and replicated 5 times. CaCo-2 experiments were done in duplicate and replicated twice.

For microscopic enumeration, after washing five times with PBS, cells were fixed with 100% methanol for 20 minutes and stained with 10% Geimsa for 15 minutes. They were then washed once with sterile distilled water and dried overnight at room temperature. Cover slips were mounted on microscope slides and observed under a phase contrast microscope with the 100× objective. Fifteen pictures of each cover slip were taken using Motic Image software following an established pattern throughout the entire cover slip. The number of cells and bacteria in each picture were counted using Image J image analysis software. Adherence was calculated as the number of adhered bacteria per tissue culture. Adherence inhibition was calculated as the number of adhered bacteria per cell in the control minus the number of adhered bacteria per cell in the treatment divided by the number of adhered bacteria per cell in the control.

For cultural enumeration, after washing 5 times with PBS, cells were detached by addition of 0.1% Triton X-100 for 30 minutes at room temperature. The cells were collected, and serial dilutions were plated on agar. Plates were incubated aerobically at 37° C. for 24 hours. Adherence inhibition was calculated as the number of adhered bacteria per ml in the control minus the number of adhered bacteria per ml in the treatment divided by the number of adhered bacteria per ml in the control.

Example 2

This example describes the experimental results demonstrating the ability of galactooligosaccharide, polydextrose, and a component of galactooligosaccharide and polydextrose to inhibit adherence of pathogens to human cell lines.

Figure 1:
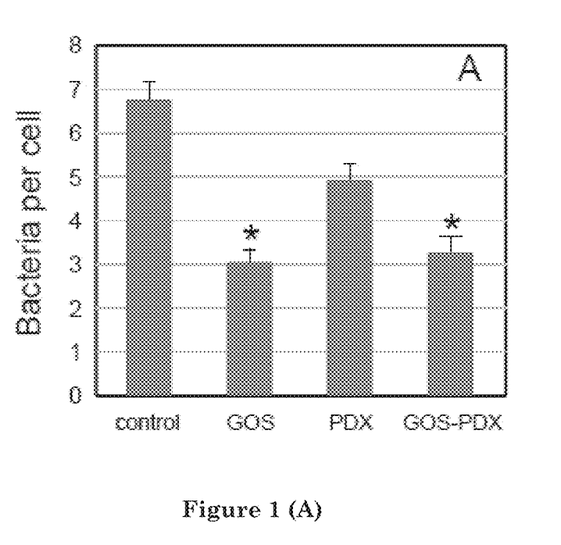
FIG. 1 illustrates the adherence of *C. sakazakii* 4603 to HEp-2 cells in the presence of prebiotics (16 mg/ml). Adherence was measured by microscopic counting (A) or by cultural enumeration (B). Statistically significant effects ($p<0.05$) are indicated by the asterisk.

Adherence of *C. sakazakii* 4603 to HEp-2 cells in the presence and absence of prebiotics was measured by microscopic and culture methods. FIG. 1 illustrates the adherence of *C. sakazakii* 4603 to HEp-2 cells in the presence of prebiotics (16 mg/ml). Adherence was measured by microscopic counting (A) or by cultural enumeration (B). Both methods revealed that *C. sakazakii* 4603 adherence was lowest when GOS was present. By microscopic examination, GOS addition led to a 56% reduction of binding by *C. sakazakii* 4603 to the HEp-2 cells (Table 2). Similarly, a 48% reduction occurred in the presence of the GOS-PDX component. However, PDX by itself did not significantly reduce adherence.

TABLE 2

Adherence inhibition of *C. sakazakii* 4603
as determined by microscopic counting

| Treatment[1] | Adherence Inhibition (%) |
|---|---|
| GOS | 56 ± 8*[2] |
| PDX | 33 ± 20 |
| GOS-PDX | 48 ± 16* |

[1]Final concentration = 16 mg/ml
[2]*= significant at $p < 0.05$ (n = 10)

Likewise, by cultural enumeration, GOS addition led to a 71% reduction of binding by *C. sakazakii* 4603 to the HEp-2 cells (Table 3). Similarly, a 49% reduction occurred in the presence of the GOS-PDX component. PDX alone led to a 55% reduction in adherence.

TABLE 3

Adherence inhibition of *C. sakazakii* 4603
as determined by cultural enumeration

| Treatment | Adherence Inhibition (%) |
|---|---|
| GOS | 71 ± 20*[2] |
| PDX | 55 ± 26* |
| GOS-PDX | 49 ± 5* |

[1]Final concentration = 16 mg/ml
[2]*= significant at $p < 0.05$ (n = 10)

Figure 2:
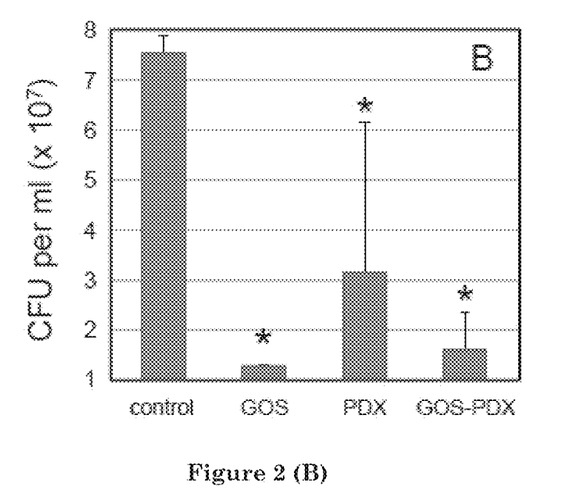
FIG. 2 illustrates adherence of *C. sakazakii* 29004 to HEp-2 cells in the presence of prebiotics (16 mg/ml). Adherence was measured by microscopic counting (A) or by cultural enumeration (B).
Figure 2A:
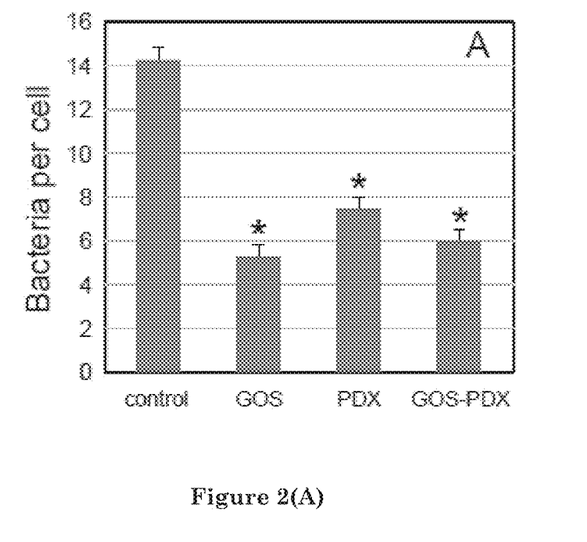
Figure 3A:
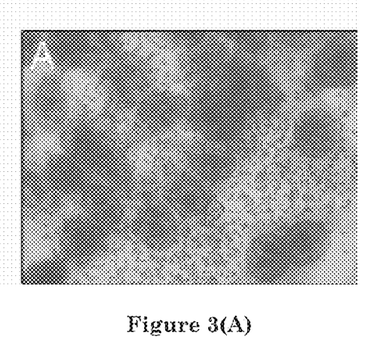
FIG. 3 shows the adherence of *C. sakazakii* 4603 to HEp-2 cells in the absence (A) and presence of GOS (B), GOS-PDX (C); and PDX (D).
Figure 3B:
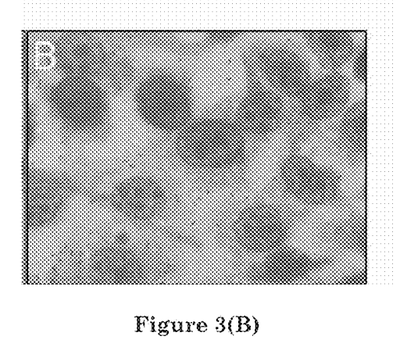
Figure 3C:
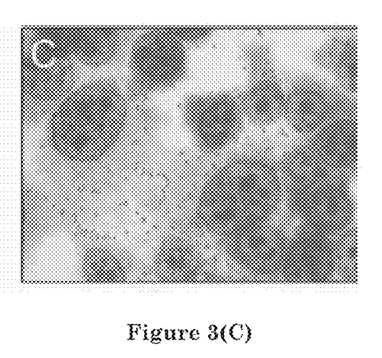
Figure 3D:
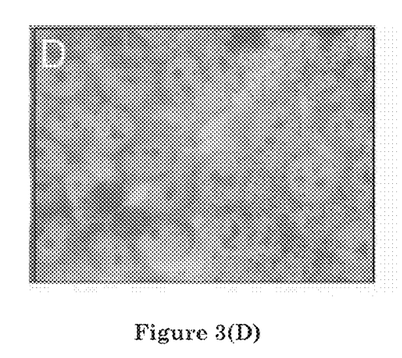

Strain ATCC 29004 gave similar results, with reductions of 63% and 53% in the presence of GOS and the GOS-PDX component, respectively as determined by microscopic counting (Table 4). However, for this strain, even the PDX significantly inhibited (42%) adherence. Moreover, similar results were obtained when determined by cultural enumeration, as GOS led to an 83% adherence inhibition, GOS-PDX led to an 80% inhibition and PDX led to a 58% adherence inhibition (Table 5). FIG. 2 illustrates adherence of *C. sakazakii* 29004 to HEp-2 cells in the presence of prebiotics (16 mg/ml), showing the results for microscopic counting (FIG. 2(A)) and cultural enumeration (FIG. 2 (B)) respectively.

TABLE 4

Adherence inhibition of *C. sakazakii* 29004
as determined by microscopic counting

| Treatment[1] | Adherence Inhibition (%) |
|---|---|
| COS | 63 ± 8*[2] |
| PDX | 42 ± 11* |
| GOS-PDX | 53 ± 8* |

[1]Final concentration = 16 mg/ml
[2]*= signfficant at $p < 0.05$ (n = 10)

TABLE 5

Adherence inhibition of *C. sakazakii* 29004
as determined by cultural enumeration

| Treatment | Adherence Inhibition (%) |
|---|---|
| GOS | 83 ± 6*[2] |
| PDX | 58 ± 27* |
| GOS-PDX | 80 ± 9* |

[1]Final concentration = 16 mg/ml
[2]significant at $p < 0.05$ (n = 10)

The cultural enumeration results confirmed those observed by microscopic examination for both strains (FIGS. 1 and 2 and Tables 3 and 5). Yet, inhibition levels were somewhat higher when the culture data was used to calculate adherence inhibition. For strain *C. sakazakii* 4603, GOS and the GOS-PDX component reduced adherence by 71% and 49%, respectively, with PDX by itself also inhibiting adherence by 55%. GOS, the GOS-PDX, and PDX alone treatments reduced adherence of strain *C. sakazakii* 29004 by 83%, 80%, and 58%, respectively. Photomicrographs of the cover slips provided additional confirmation that adherence of *C. sakazakii* 4603 to HEp-2 cells was reduced in the presence of GOS (FIG. 3). FIG. 3 shows the adherence of *C. sakazakii* 4603 to HEp-2 cells in the absence (FIG. 3(A)) and presence of GOS (FIG. 3(B)), GOS-PDX (FIG. 3(C)); and PDX (FIG. 3(D)). These results suggest that GOS may have an anti-adhesive effect on *C. sakazakii* and directly inhibit the adherence of this organism to gastrointestinal epithelial cells.

Figure 4:
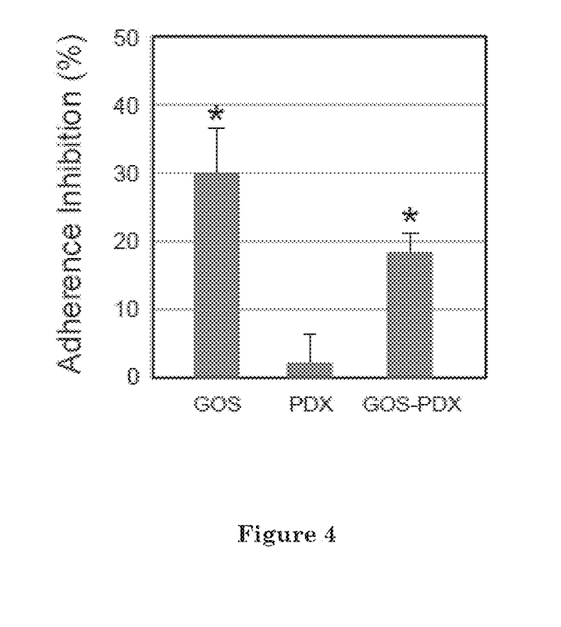
FIG. 4 illustrates the adherence of enteropathogenic *Escherichia coli* (*E. coli* E2348/69) to HEp-2 cells in the presence of prebiotics (16 mg/ml). Adherence was measured by microscopic counting. Significance (versus the control) is indicated by asterisks.

To confirm that the GOS inhibited adhesion of pathogens, adherence inhibition experiments with *E. coli* E2348/69 and Hep-2 tissue cultures were performed. The results (FIG. 4) showed that GOS did indeed inhibit adherence of *E. coli* E2348/69 to Hep-2 tissue cultures. FIG. 4 illustrates the adherence of *E. coli* E2348/69 to HEp-2 cells in the presence of prebiotics (16 mg/ml). Adherence was measured by microscopic counting. Significance (versus the control) is indicated by asterisks in FIG. 4.

Figure 5:
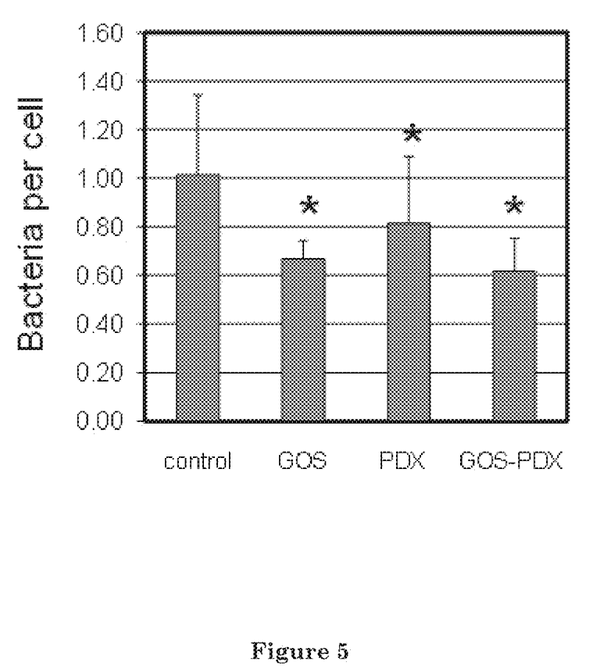
FIG. 5 illustrates the adherence of *C. sakazakii* 29004 to Caco-2 cells in the presence of prebiotics. Adherence was measured by microscopic counting.

Moreover, FIG. 5 shows that galactooligosaccharide and polydextrose also inhibited the adherence of *C. sakazakii* (4603, 29004) to Caco-2 cells. FIG. 5 illustrates the adherence of *C. sakazakii* 29004 to Caco-2 cells in the presence of prebiotics, where adherence was measured by microscopic counting.

Example 3

This example illustrates one embodiment of a nutritional product according to the present disclosure.

TABLE 6

Nutritional Composition with Prebiotic Component

| Ingredient | Per 10,000 L |
|---|---|
| Demineralized Whey Solids | 534.337 kg |
| Fat Component | 339.695 kg |
| Nonfat Milk Solids | 191.234 kg |
| Lactose | 136.321 kg |
| Galactooligosaccharide Syrup Solid | 35.096 kg |
| Polydextrose | 22.222 kg |
| Potassium Citrate | 7.797 kg |
| Mono- and Diglycerides | 7.233 kg |
| Single Cell Arachidonic Acid Oil | 6.486 kg |
| Calcium Phosphate, Tribasic | 4.185 kg |
| Ascorbic Acid | 1,403.323 g |
| Sodium Ascorbate | 1,168.402 g |
| Inositol | 407.029 g |
| Taurine | 402.962 g |
| Corn Syrup Solids | 188.300 g |
| Niacimarnide | 89.857 g |
| Calcium Pantothenate | 42.443 g |
| Vitamin B12 | 23.613 g |
| Biotin Trituration | 23.613 g |
| Thiamin HCl | 8.022 g |
| Pyridoxine HCl | 6.176 g |
| Folic Acid | 2.260 g |
| Lecithin Concentrate | 3.694 kg |
| Single Cell Docosahexaenoic Acid Oil | 3.243 kg |
| Carrageenan | 2.826 kg |
| Calcium Chloride | 2.650 kg |
| Sodium Chloride | 1.410 kg |
| Maltodextrin | 484.199 g |
| CMP, free acid | 151.951 g |
| AMP, free acid | 33.944 g |

TABLE 6-continued

Nutritional Composition with Prebiotic Component

| Ingredient | Per 10,000 L |
|---|---|
| GMP, disodium salt | 18.347 g |
| UMP, disodium salt | 7.559 g |
| Ferrous Sulfate | 0.620 kg |
| Sodium Citrate | 0.455 kg |
| Tocopheryl Acetate, DL-Alpha | 160.882 g |
| Soy Oil | 139.612 g |
| Vitamin A Palmitate | 17.253 g |
| Cholecalciferol Concentrate | 5.715 g |
| Vitamin K, Liquid Phytonadione | 0.538 g |
| Zinc Sulfate | 214.225 g |
| Sodium Selenite | 51.112 g |
| Cupric Sulfate | 22.885 g |
| Lactose | 12.659 g |
| Manganese Sulfate | 3.119 g |
| Water, Deflouridated | 10,311.900 kg |

LOS is generated when lactose is heated at a high temperature. Therefore, in this embodiment the product contains indigenous LOS. The level of indigenous LOS in the product is approximately 2 g/L.

Example 4

This example illustrates one embodiment of a nutritional product according to the present disclosure.

TABLE 7

Nutritional Composition with Prebiotic Component

| Ingredient | Per 10,000 L |
|---|---|
| Demineralized Whey Solids | 534.337 kg |
| Fat Component | 339.695 kg |
| Nonfat Milk Solids | 191.234 kg |
| Lactose | 142.000 kg |
| Galactooligosaccharide Syrup Solid | 23.164 kg |
| Polydextrose | 22.222 kg |
| Lactulose Syrup Solid | 10.353 kg |
| Potassium Citrate | 7.797 kg |
| Mono- and Diglycerides | 7.233 kg |
| Single Cell Arachidonic Acid Oil | 6.486 kg |
| Calcium Phosphate, Tribasic | 4.185 kg |
| Ascorbic Acid | 1,403.323 g |
| Sodium Ascorbate | 1,168.402 g |
| Inositol | 407.029 g |
| Taurine | 402.962 g |
| Corn Syrup Solids | 188.300 g |
| Niacimarnide | 89.857 g |
| Calcium Pantothenate | 42.443 g |
| Vitamin B12 | 23.613 g |
| Biotin Trituration | 23.613 g |
| Thiamin HCl | 8.022 g |
| Pyridoxine HCl | 6.176 g |
| Folic Acid | 2.260 g |
| Lecithin Concentrate | 3.694 kg |
| Single Cell Docosahexaenoic Acid Oil | 3.243 kg |
| Carrageenan | 2.826 kg |
| Calcium Chloride | 2.650 kg |
| Sodium Chloride | 1.410 kg |
| Maltodextrin | 484.199 g |
| CMP, free acid | 151.951 g |
| AMP, free acid | 33.944 g |
| GMP, disodium salt | 18.347 g |
| UMP, disodium salt | 7.559 g |
| Ferrous Sulfate | 0.620 kg |
| Sodium Citrate | 0.455 kg |
| Tocopheryl Acetate, DL-Alpha | 160.882 g |
| Soy Oil | 139.612 g |
| Vitamin A Palmitate | 17.253 g |
| Cholecalciferol Concentrate | 5.715 g |
| Vitamin K, Liquid Phytonadione | 0.538 g |

TABLE 7-continued

Nutritional Composition with Prebiotic Component

| Ingredient | Per 10,000 L |
|---|---|
| Zinc Sulfate | 214.225 g |
| Sodium Selenite | 51.112 g |
| Cupric Sulfate | 22.885 g |
| Lactose | 12.659 g |
| Manganese Sulfate | 3.119 g |
| Water, Deflouridated | 10,311.900 kg |

LOS is generated when lactose is heated at a high temperature. Therefore, in this embodiment the product contains indigenous LOS. The level of indigenous LOS in the product is approximately 2.6 g/L.

Example 5

This example illustrates one embodiment of a nutritional product according to the present disclosure.

TABLE 8

Nutritional Composition with Prebiotic Component

| Ingredient | Per 10,000 L |
|---|---|
| Demineralized Whey Solids | 534.337 kg |
| Fat Component | 339.695 kg |
| Nonfat Milk Solids | 191.234 kg |
| Lactose | 119.321 kg |
| Galactooligosaccharide Syrup Solid | 46.327 kg |
| Polydextrose | 44.444 kg |
| Lactulose Syrup Solid | 20.706 kg |
| Potassium Citrate | 7.797 kg |
| Mono- and Diglycerides | 7.233 kg |
| Single Cell Arachidonic Acid Oil | 6.486 kg |
| Calcium Phosphate, Tribasic | 4.185 kg |
| Ascorbic Acid | 1,403.323 g |
| Sodium Ascorbate | 1,168.402 g |
| Inositol | 407.029 g |
| Taurine | 402.962 g |
| Corn Syrup Solids | 188.300 g |
| Niacimarnide | 89.857 g |
| Calcium Pantothenate | 42.443 g |
| Vitamin B12 | 23.613 g |
| Biotin Trituration | 23.613 g |
| Thiamin HCl | 8.022 g |
| Pyridoxine HCl | 6.176 g |
| Folic Acid | 2.260 g |
| Lecithin Concentrate | 3.694 kg |
| Single Cell Docosahexaenoic Acid Oil | 3.243 kg |
| Carrageenan | 2.826 kg |
| Calcium Chloride | 2.650 kg |
| Sodium Chloride | 1.410 kg |
| Maltodextrin | 484.199 g |
| CMP, free acid | 151.951 g |
| AMP, free acid | 33.944 g |
| GMP, disodium salt | 18.347 g |
| UMP, disodium salt | 7.559 g |
| Ferrous Sulfate | 0.620 kg |
| Sodium Citrate | 0.455 kg |
| Tocopheryl Acetate, DL-Alpha | 160.882 g |
| Soy Oil | 139.612 g |
| Vitamin A Palmitate | 17.253 g |
| Cholecalciferol Concentrate | 5.715 g |
| Vitamin K, Liquid Phytonadione | 0.538 g |
| Zinc Sulfate | 214.225 g |
| Sodium Selenite | 51.112 g |
| Cupric Sulfate | 22.885 g |
| Lactose | 12.659 g |
| Manganese Sulfate | 3.119 g |
| Water, Deflouridated | 10,325.600 kg |

LOS is generated when lactose is heated at a high temperature. Therefore, in this embodiment the product contains indigenous LOS. The level of indigenous LOS in the product is approximately 3.6 g/L.

All references cited in this specification, including without limitation, all papers, publications, patents, patent applications, presentations, texts, reports, manuscripts, brochures, books, internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinence of the cited references.

Although embodiments of the disclosure have been described using specific terms, devices, and methods, such description is for illustrative purposes only. The words used are words of description rather than of limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. For example, while methods for the production of a commercially sterile liquid nutritional supplement made according to those methods have been exemplified, other uses are contemplated. Therefore, the appended claims should not be limited to the description of the versions contained therein.

What is claimed is:

1. A method for inhibiting adhesion of pathogens in the gastrointestinal tract of a human subject, comprising administering a nutritional composition which comprises:
    (a) a prebiotic component, the prebiotic component comprising a galactooligosaccharide and polydextrose, wherein the combination of the galactooligosaccharide and polydextrose is present in an amount of between about 1.0 g/L and about 10.0 g/L of the nutritional composition; and
    (b) at least one long chain polyunsaturated fatty acid in an amount of at least 5 mg/100 kcal of the nutritional composition.

2. The method according to claim 1, wherein the ratio of polydextrose to galactooligosaccharide is between 9:1 and 1:9, wherein the ratio is determined based on the presence of each component in the nutritional composition in g/L.

3. The method according to claim 1, further comprising the step of administering at least one probiotic.

4. The method according to claim 3, wherein the probiotic is selected from the group consisting of *Bifidobacteria* spp., *Lactobacillus* spp. and a combination thereof.

5. The method according to claim 1, wherein the long chain polyunsaturated fatty acid is selected from the group consisting of docosahexaenoic acid, arachidonic acid, and a combination thereof.

6. The method according to claim 1, wherein the nutritional composition further comprises
    a fat or lipid source; and
    a protein source.

7. The method according to claim 6, wherein the nutritional composition is an infant formula.

8. The method according to claim 7, wherein the nutritional composition is nutritionally complete.

9. The method according to claim 1, wherein the long chain polyunsaturated fatty acid is selected from the group consisting of docosahexaenoic acid, arachidonic acid, and a combination thereof.

10. The method according to claim 6, wherein the fat or lipid source is present at a level of about 3 to about 7 g/100 kcal.

11. The method according to claim 6, wherein the protein source is present at a level of about 1 to about 5 g/100 kcal.

12. The method according to claim 11, wherein the protein source is selected from the group consisting of whey protein, casein, casein protein, nonfat milk, hydrolyzed protein and combinations thereof.

* * * * *